US012785133B2

(12) United States Patent
Xi et al.

(10) Patent No.: US 12,785,133 B2
(45) Date of Patent: Nov. 3, 2026

(54) POLYGONAL BATTERY CELL WITH WOUND JELLY ROLL

(71) Applicant: GM GLOBAL TECHNOLOGY OPERATIONS LLC, Detroit, MI (US)

(72) Inventors: Liang Xi, Northville, MI (US); Michael V. Pyrtko, Ferndale, MI (US); SriLakshmi Katar, Troy, MI (US); Michael A. Lelli, Rochester, MI (US)

(73) Assignee: GM Global Technology Operations LLC, Detroit, MI (US)

(*) Notice: Subject to any disclaimer, the term of this patent is extended or adjusted under 35 U.S.C. 154(b) by 684 days.

(21) Appl. No.: 18/351,833

(22) Filed: Jul. 13, 2023

(65) Prior Publication Data

US 2025/0023088 A1 Jan. 16, 2025

(51) Int. Cl.

| | |
|---|---|
| ***H01M 10/04*** | (2006.01) |
| ***H01M 50/103*** | (2021.01) |
| ***H01M 50/46*** | (2021.01) |
| ***H01M 50/538*** | (2021.01) |
| *H01M 4/02* | (2006.01) |

(52) U.S. Cl.

CPC ..... *H01M 10/0431* (2013.01); *H01M 50/103* (2021.01); *H01M 50/46* (2021.01); *H01M 50/538* (2021.01); *H01M 2004/021* (2013.01); *H01M 2004/027* (2013.01); *H01M 2004/028* (2013.01)

(58) Field of Classification Search

CPC ......... H01M 10/0431; H01M 10/6555; H01M 10/64; H01M 10/613; H01M 10/263; H01M 2220/30; H01M 2004/025; H01M 10/04; H01M 50/103; H01M 50/46; H01M 50/538; H01M 2004/021; H01M 2004/027; H01M 2004/028; H01M 10/0587; Y02E 60/10; Y02P 70/50; B60L 50/64

See application file for complete search history.

(56) References Cited

U.S. PATENT DOCUMENTS

| | | | | |
|---|---|---|---|---|
| 9,929,393 | B2 * | 3/2018 | Shiu | H01M 10/0431 |
| 11,575,145 | B2 * | 2/2023 | Park | H01M 10/613 |
| 2020/0091490 | A1 | 3/2020 | Fees | |

FOREIGN PATENT DOCUMENTS

CN 205944252 U * 2/2017

OTHER PUBLICATIONS

CN 205944252U: WIPO Machine Translation & Chinese Original (Year: 2026).*

* cited by examiner

*Primary Examiner* — Nicole M. Buie-Hatcher
*Assistant Examiner* — Samantha Lee Hanyon
(74) *Attorney, Agent, or Firm* — Quinn IP Law

(57) ABSTRACT

A hexagonal battery cell. The battery cell may include a wound jelly roll within a hexagonally shaped case. The jelly roll may include a separator layer sandwiched between a cathode layer and an anode layer, with the separator, cathode, and anode layers wound together relative to a central axis. The hexagonally shaped case may surround a perimeter of the jelly roll.

18 Claims, 4 Drawing Sheets

POLYGONAL BATTERY CELL WITH WOUND JELLY ROLL

INTRODUCTION

The present disclosure relates to battery cells configured for storing and supplying electrical power, such as but not necessarily limited to hexagonally shaped battery cells configured for maximizing volumetric efficiency and cell density of vehicle battery packs.

A vehicle may include a battery cell to facilitate storing and supplying electrical power for a wide variety of electrically dependent operations. While other types of devices may similarly employ battery cells, vehicles having high power demands, such as those employing an electric motor to propel the vehicle, may include multiple battery cells, often with the battery cells being contained within one or more battery packs. A battery pack may be generally understood to correspond with a structure configured for housing and electrically interconnecting a plurality of battery cells. It may be advantageous for vehicles and other devices employing such battery packs to maximize the quantity of battery cells capable of being stored within therein so as to maximize volumetric efficiency and cell density. The ability to closely pack battery cells next to each other, and thereby maximize volumetric efficiency and cell density, may be beneficial in minimizing packaging, minimizing battery pack footprint, enabling more battery cells to be used in the same battery pack, e.g., to support higher power applications, permitting the use of differing shapes or form factors, improving design flexibility, enhancing cost savings, etc.

SUMMARY

One non-limiting aspect of the present disclosure relates to a polygonally shaped battery cell, such as but not necessarily limited to a hexagonally shaped battery cell. The hexagonally shaped battery cell may include a hexagonally shaped case surrounding a perimeter of a jelly roll. The hexagonally shaped case may include a plurality of flat sides arranged in the shape of a hexagon so that the flat sides of multiple battery cells may be packed in a side-by-side facing relationship to maximize volumetric efficiency and cell density of a battery pack.

One non-limiting aspect of the present disclosure relates to battery cell. The battery cell may include a jelly roll having a separator layer sandwiched between a cathode layer and an anode layer, with the separator, cathode, and anode layers wound together relative to a central axis. The battery cell may further include a hexagonally shaped case surrounding a perimeter of the jelly roll, optionally with the hexagonally shaped case including six sides and six vertices, with each vertex occurring at adjacent pairs of the sides.

The cathode layer may include a non-uniform, variable thickness, with a plurality of first cathode sections having a first thickness interspersed between a plurality of second cathode sections having a second thickness, the second thickness being greater than the first thickness.

The second cathode sections may be spaced apart from each other along a length of the cathode layer such that each second cathode section aligns when wound with one of a plurality of a radii extending from the central axis to each one of the vertices.

The anode layer may include a non-uniform, variable thickness, with a plurality of first anode sections having a first thickness interspersed between a plurality of second anode sections having a second thickness, the second thickness being greater than the first thickness.

The second anode sections may be spaced apart from each other along a length of the anode layer such that each second anode section aligns when wound with one of a plurality of a radii extending from the central axis to each one of the vertices.

The battery cell may include a plurality of cathode current collector tabs spaced apart from each other along a length of the cathode layer such that each cathode current collector tab aligns when wound with one of a plurality of a radii extending from the central axis to each one of the vertices.

The battery cell ac may include a plurality of anode current collector tabs spaced apart from each other along a length of the anode layer such that each anode current collector tab aligns when wound with one of a plurality of a radii extending from the central axis to each one of the vertices.

The separator layer may include a uniform, continuous thickness.

The hexagonally shaped case may include a regular hexagon configuration, with the sides having equal lengths and the vertices have equal angles.

The hexagonally shaped case may include an irregular hexagon configuration, with at least one of one or more of the sides having unequal lengths and one or more of the vertices have unequal angles.

The jelly roll and the central axis may be circularly shaped.

The jelly roll and the central axis may be hexagonally shaped.

One non-limiting aspect of the present disclosure relates to a battery cell. The battery cell may include a jelly roll having a separator layer sandwiched between a cathode layer and an anode layer, with the separator, cathode, and anode layers wound together relative to a central axis. The battery cell may further include a polygonally shaped case surrounding a perimeter of the jelly roll, optionally with the polygonally shaped case including a plurality of straight case sides and a plurality of case vertices, with each case vertex occurring at adjacent pairs of the straight case sides.

The cathode layer may include a plurality of first cathode sections having a first thickness interspersed between a plurality of second cathode sections having a second thickness greater than the first thickness, optionally with the second cathode sections spaced apart from each other along a length of the cathode layer such that each second cathode section aligns when wound with one of a plurality of a radii extending from the central axis to each one of the vertices.

The anode layer may include a plurality of first anode sections having a first thickness interspersed between a plurality of second anode sections having a second thickness greater than the first thickness, optionally with the second anode sections spaced apart from each other along a length of the anode layer such that each second anode section aligns when wound with one of the radii.

The battery cell may include a plurality of cathode current collector tabs spaced apart from each other along a length of the cathode layer such that each cathode current collector tab aligns when wound with one of the radii extending from the central axis to each one of the vertices.

The battery cell may include a plurality of anode current collector tabs spaced apart from each other along a length of the anode layer such that each anode current collector tab aligns when wound with one of the radii.

The polygonally shaped case may include a regular polygon configuration, with the straight case sides having equal lengths and the case vertices have equal angles.

The polygonally shaped case may include an irregular polygon configuration, with at least one of one or more of the straight case sides having unequal lengths and one or more of the case vertices have unequal angles.

The jelly roll may include a plurality of straight roll sides and a plurality of roll vertices concentrically arranged with a corresponding one of the case sides and case vertices.

The straight roll sides and the roll vertices may abut the corresponding one of the case sides and case vertices.

One non-limiting aspect of the present disclosure relates to a battery cell system. The system may include a plurality of battery cells, optionally with each battery cell including a polygonally shaped case including a plurality of straight case sides and a plurality of case vertices with one of a plurality of a radii extending from a central axis to each one of the vertices and a polygonally shaped jelly roll having a separator layer sandwiched between a cathode layer and an anode layer, with the separator, cathode, and anode layers wound together relative to the central axis. The polygonally shaped jelly roll may include a plurality of straight roll sides and a plurality of roll vertices concentrically arranged relative to a matching one of the case sides and case vertices. The system may further include a pack housing containing the battery cells in a side-by-side manner such that one of the straight case sides of each battery cell abuts no more than one of the straight case sides of each adjacent one of the battery cells.

These features and advantages, along with other features and advantages of the present teachings, are readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
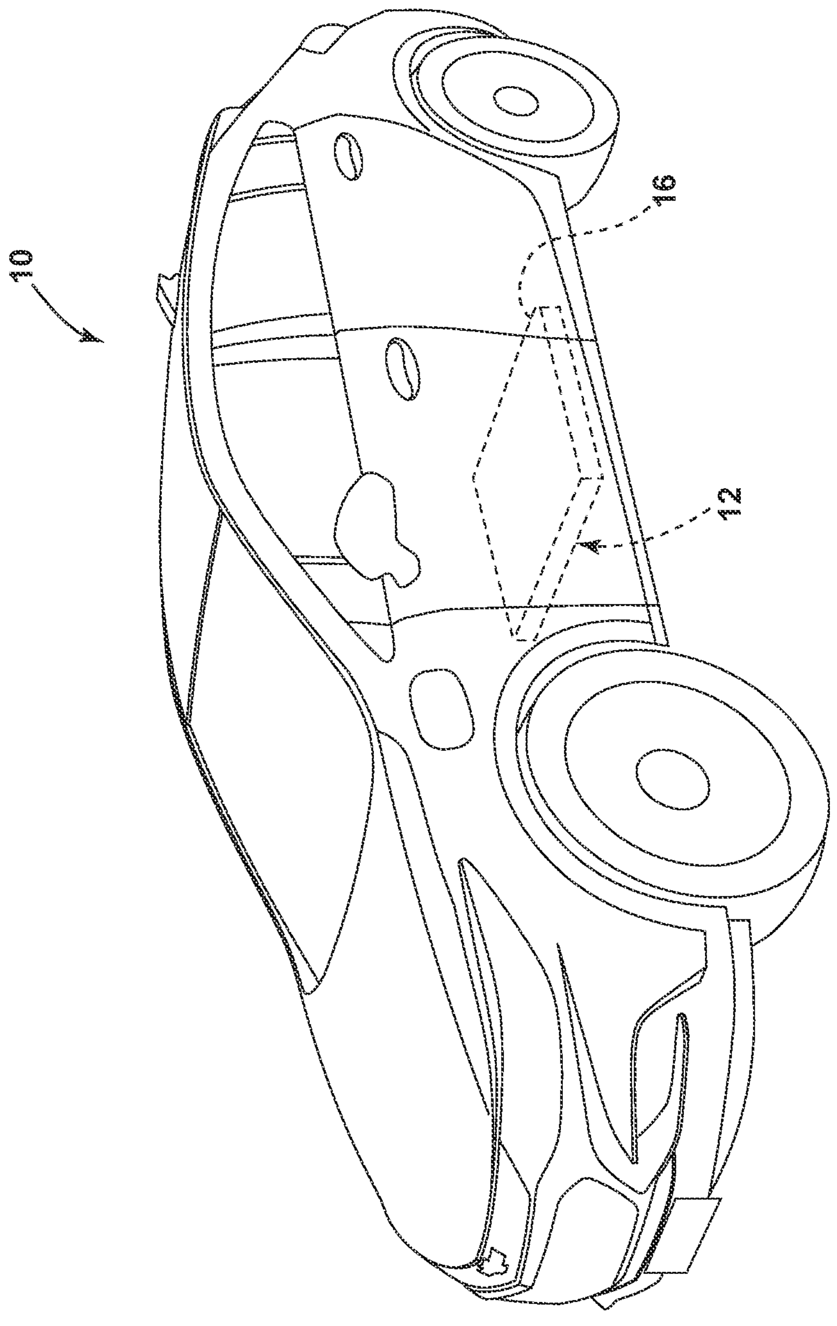
FIG. 1 illustrates a vehicle having a battery pack in accordance with one non-limiting aspect of the present disclosure.

FIG. 1 illustrates a vehicle 10 having a battery pack 12 in accordance with one non-limiting aspect of the present disclosure. The vehicle 10 may be configured with a propulsion system, powertrain, or other drivetrain having an electric motor or other electrically driven device operable for propelling or otherwise driving the vehicle 10. The vehicle 10 may optionally be a hybrid type of vehicle 10 having an internal combustion engine (ICE) operating in concert with the electric motor. The ICE and the electric motor, or other device configured to convert electrical power to mechanical power, may cooperate to provide rotational force/torque to one or more of a plurality of wheels. The powertrain may include a transmission, a driveshaft, a differential, axles and/or other componentry to facilitate conveying rotative force from the ICE and/or the motor to the wheels. The vehicle 10 may include a controller to generate control signals associated with directing and otherwise implementing desired control of the powertrain, the motor, the ICE, and/or other features of the vehicle 10. The vehicle 10 is presented for non-limiting purposes as being representative of a wide variety of vehicles and/or other devices that may rely upon the battery pack 12 to supply and store electrical power. The battery pack 12, for example, may be included as part of a rechargeable energy storage system (RESS) operable for supplying and storing electrical power for the motor and/or other systems onboard and/or offboard the vehicle 10.

The vehicle 10 may be generically referred to as an electric vehicle and include a wide range of capabilities for supporting the conversion of electrical power to mechanical power. The vehicle 10 is contemplated to include differing configurations for generating, storing, and supplying electrical power to the electric motor and/or other devices or system onboard the vehicle 10, optionally in place of or in concert with the battery pack 12. As described in more detail below, the battery pack 12 may include a plurality of polygonally shaped battery cells 14 packed together in a side-by-side facing relationship. The battery cells 14 may be housed within a structure of the battery pack 12, which is illustrated for non-limiting purposes to include a pack housing 16 having a plurality of walls configured to enclose the battery cells 14. The battery pack 12 may include electrical circuits (not shown) to electrically interconnected the battery cells 14 and/or selectable groups of the battery cells 14 for purposes of exchanging electrical power with other components onboard and offboard the vehicle 10. The battery cells 14 presented herein are predominantly described with respect to being included within the battery pack 12 for non-limiting purposes as the present disclosure fully contemplates the battery cell 14 being useful and beneficial in a wide variety of applications, including those that may not pack multiple battery cells 14 within the same structure.

Figure 4:
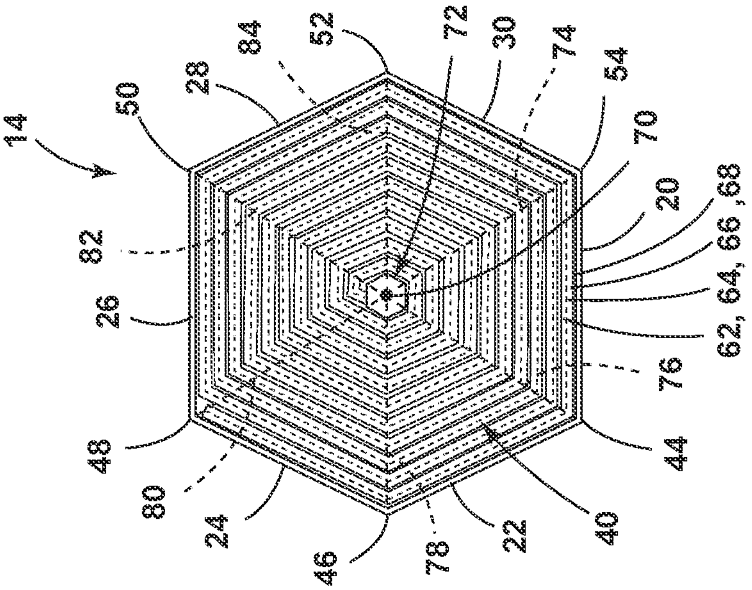
FIG. 4 illustrates a cross-sectional view of the battery cell in accordance with one non-limiting aspect of the present disclosure.
Figure 2:
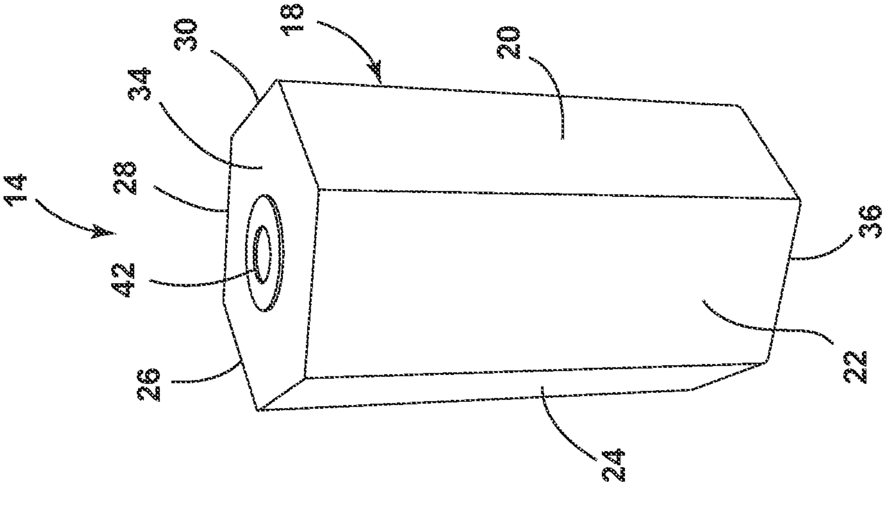
FIG. 2 illustrates a battery cell in accordance with one non-limiting aspect of the present disclosure.

FIGS. 2 and 4 illustrate the battery cell 14 in accordance with one non-limiting aspect of the present disclosure. The battery cell 14 may include a polygonally shaped battery case 18 having a plurality of sides 20, 22, 24, 26, 28, 30 disposed between a top endcap 34 and a bottom endcap 36, with an electrical generating feature 40 (shown in FIG. 4) disposed within a perimeter thereof, which as one skilled in the art will appreciate may be referred to as a jelly roll 40. The top and bottom endcaps 34, 36 (shown in FIG. 2) may include terminals, connectors, and/or other features 42 suitable for establishing electrical conductivity with the jelly roll 40. The polygonally shaped battery case 18 is shown for non-limiting purposes to be hexagonally in shape, with six sides 20, 22, 24, 26, 28, 30 and six vertices 44, 46, 48, 50, 52, 54, which may each include a blending radius, e.g., 0.5-5 mm, to present a smoother surface and avoid sharp corners. While the polygonally shaped case 18 is shown in the form of a hexagon, the present disclosure fully contemplates the case 18 having other polygonal shapes and configurations, including being shaped as a triangle (3 sides), quadrilateral (4 sides), pentagon (5 sides), heptagon (7 sides), octagon (8 sides), nonagon (9 sides), decagon (10 sides), etc. The battery case 18 is also described to include the polygonally shape for non-limiting purposes as the present disclosure fully contemplates the battery case 18 including other non-polygonally shapes. The polygonally shape, or more specifically being shaped to include one or more straight or flat sides 20, 22, 24, 26, 28, 30, such as with the illustrated hexagonally shaping having multiple flat sides 20, 22, 24, 26, 28, 30, may be beneficial in enabling the battery cell 14 to be packed closely together to minimize gaps between adjoining battery cells 14. The capability of the battery cells 14 to be closely packed to other battery cells 14 may be beneficial in a number of implementations, and particularly with respect to enabling the side-by-side facing relationship utilized to maximize volumetric efficiency and cell density of the battery pack 12.

Figure 3:
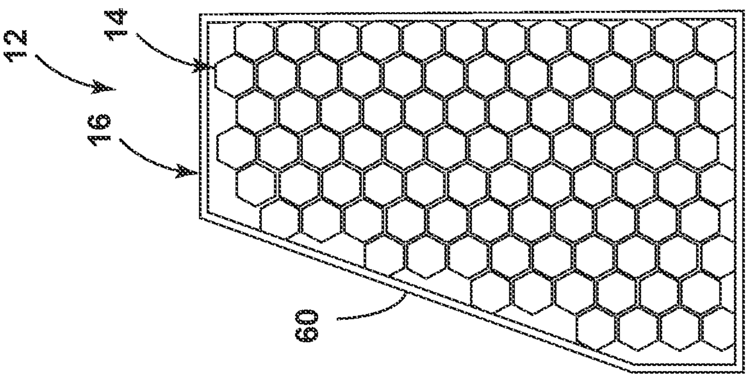
FIG. 3 illustrates a schematic view of the battery pack in accordance with one non-limiting aspect of the present disclosure.

FIG. 3 illustrates a schematic view of the battery pack 12 in accordance with one non-limiting aspect of the present disclosure. The battery pack 12 is shown for illustrative purposes with respect to the pack housing 16 having an angled, box-like configuration, with one of the walls 60 shaped at an angle to provide a sloping profile. This is presented for non-limiting purposes as the present disclosure fully contemplates the pack housing 16 having other shapes and configurations, optionally with the battery pack 12 including multiple, individual pack housings 16 separately interconnected with each other. The illustrated shaping of the pack housing 16 is presented to highlight a common configuration for the battery pack 12 when included onboard an electric vehicle 10 due to electric vehicles often having form factor or other constraints whereby flat or straight sides of varying dimension may be required. Even if the pack housing 16 had other configurations, including arcuate or curved walls or features, the advantageous capabilities of the battery cell 14 configuration described herein to facilitate closely packing battery cells 14 next to each other in the side-by-side relationship may be apparent from how little space between the battery cells 14 and/or the walls is unused or wasted. The capability to closely pack the battery cells 14 within the battery pack 12, such as by placing a flat side of one battery cell 14 against a flat side of another battery cell 14 or wall of the pack housing, may be useful in maximizing cell density.

FIG. 4 illustrates a schematic cross-sectional view of the battery cell 14 in accordance with one non-limiting aspect of the present disclosure. The jelly roll 40 may be disposed within the battery case 18 (shown in FIG. 2), optionally extending from top to bottom between the top and bottom endcaps 34, 36. The jelly roll 40 may include a plurality of layers 62, 64, 66, 68, which may include a first separator layer 62, a cathode active material layer 64, a second separator layer 66, and an anode active material layer 68, as shown in FIG. 4. The layers 62, 64, 66, 68, may be wound together relative to a central axis 70 of a mandrel 72, and once disposed within the battery case 18, an electrolyte (not shown) may be included therewith. While the jelly roll 40 may be non-polygonally shaped, it is presented with a polygonally shape matching the battery case 18. The jelly roll 40 may include a plurality of straight roll sides and a plurality of roll vertices concentrically arranged with a corresponding one of the case sides 20, 22, 24, 26, 28, 30 and case vertices 44, 46, 48, 50, 52, 54. As one skilled in the art would appreciate, the jelly roll 40 may include a wide variety of configurations, layers, materials, etc. to facilitate storying and supplying electrical power. The illustrated layers, as such, are presented for non-limiting purposes as merely exemplary of common components typically included as at least part of the jelly roll 40. The battery cell 14 may be configured in this manner to correspond with what one skilled in the art may refer to as a prismatic battery cell 14 or a battery cell 14 having a prismatic can. This too is done for non-limiting purposes as the present disclosure fully contemplates the battery cell 14 having other configurations.

In some embodiments, the battery cell 14 may be constructed as a type of Lithium-ion battery, optionally with a negative current collector layer including copper, the anode electrode layer 68 including a material chosen from: graphite, Lithium Titanate, Silicon/Carbon, or Tin/Cobalt alloy, or combinations thereof, the separator layers 62, 64 including a micro-porous polyolefin polymer chosen from: micro-porous polyethylene (PE), micro-porous polypropylene (PP), or micro-porous polyethylene terephthalate (PET), and combinations thereof, and the cathode electrode layer 64 including a compound chosen from: lithium-metal-oxides, $LiCoO_2$ (LCO), $LiMn_2O_4$ (LMO), $LiFePO_4$ (LFP), Nickel-Manganese-Cobalt oxides (NMC), or Nickel-Cobalt-Aluminum Oxide (NCA), and combinations thereof, and the positive current collector layer 42 including aluminum.

The jelly roll 40 may be configured to include a volumetrically adjoining fit with the battery case 18. The volumetrically adjoining fit may be characterized by the jelly roll 40 adjoining, contacting, or being in close proximity to each of the sides 20, 22, 24, 26, 28, 30 and vertices 44, 46, 48, 50, 52, 54 such that the jelly roll 40 may be considered to effectively fill an entirety of the cross-sectional area of the battery case 18. In the event additional components (not shown) may be included as part of the jelly roll 40 and/or the battery cell 14, the jelly roll 40 may be similarly configured to minimize the amount of unused or unoccupied space within the battery case 18. The jelly roll 40 is shown to be wound relative to the mandrel, which may include a hexagonal shape to facilitate orientating, pushing, or otherwise positioning the layers into or relative the vertices 44, 46, 48, 50, 52, 54. The hexagonal mandrel, however, may be shaped differently, such as by having a circular or flatter cross-section and/or the jelly roll 40 may be wound and/or disposed within the battery case 18 without use of the mandrel 72.

The battery case 18 may be configured to include a plurality of a radii 74, 76, 78, 80, 82, 84, with each one of the radii 74, 76, 78, 80, 82, 84 extending from the central axis to a corresponding one of the vertices 44, 46, 48, 50, 52, 54. The battery base is shown to include a regular polygon (hexagonal) configuration insofar as each of the sides 20, 22, 24, 26, 28, 30 having an equal length, each of the vertices 44, 46, 48, 50, 52, 54 having an equal angle, and each of the radii 74, 76, 78, 80, 82, 84 having an equal length and relative spacing. The battery case 18 may alternatively be configured with an irregular polygon (hexagon) configuration, such as by having one or more of the sides 20, 22, 24, 26, 28, 30 with unequal lengths and/or one or more of the vertices 44, 46, 48, 50, 52, 54 with unequal angles. The battery pack 12 may alternatively be configured with the battery cells 14 having differing constructions, such as by including some of the battery cells 14 with the regular polygon configuration and including other battery cells 14 with the irregular polygon configuration. Returning to FIG. 3, the battery cells 14 are each shown to have the regular hexagonal configuration, which may be beneficial in minimizing manufacturing complexity when installing, packaging or otherwise arranging the battery cells 14 within the battery pack 12, at least with respect to manufacturing without having to specifically orientate each battery cell 14 to account from some battery cells 14 having differing shapes, sizes, etc.

Figure 7:
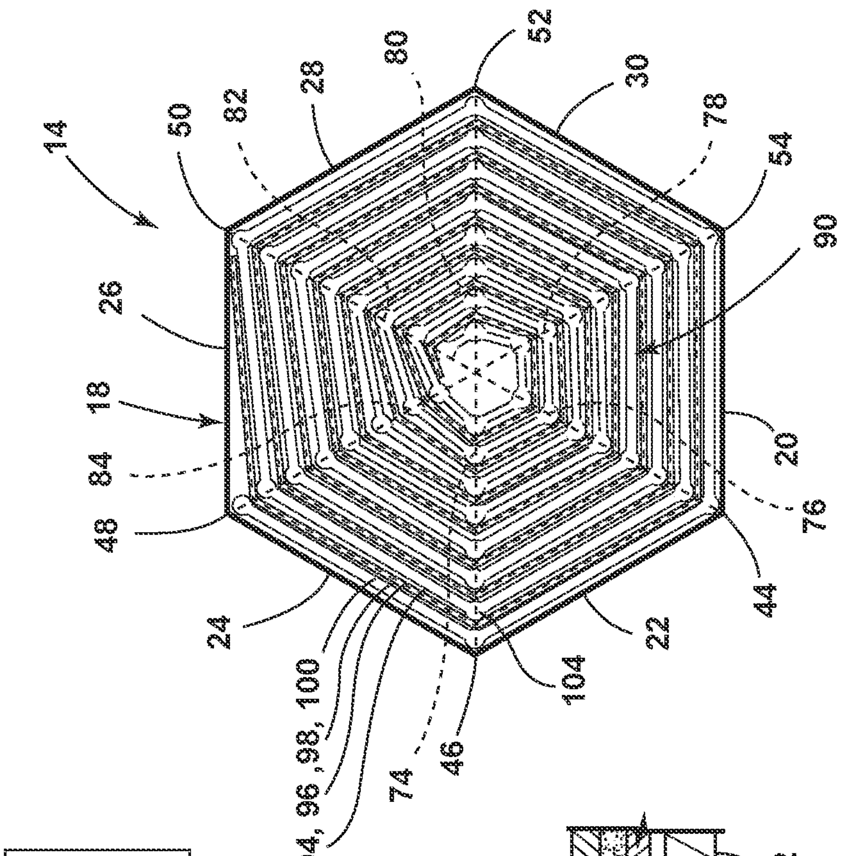
FIG. 7 illustrates a cross-sectional view of the battery cell including the tabless jelly roll in accordance with one non-limiting aspect of the present disclosure.
Figure 5:
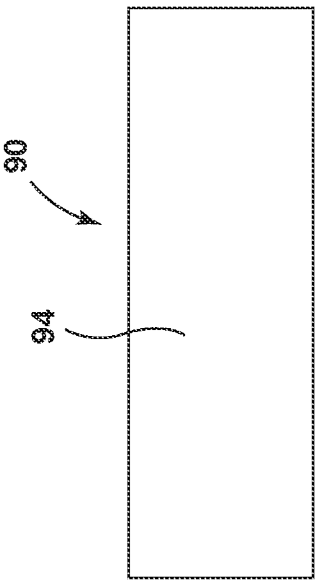
FIG. 5 illustrates a partial, top view of a tabless jelly roll in accordance with one non-limiting aspect of the present disclosure.
Figure 6:
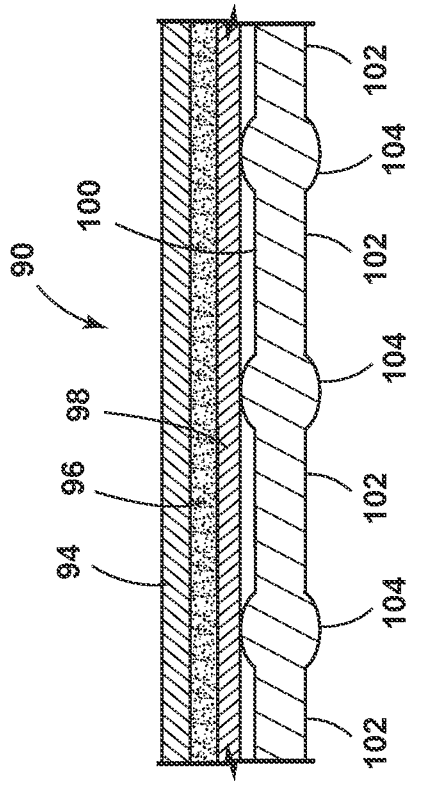
FIG. 6 illustrates a cross-sectional view of the tabless jelly roll in accordance with one non-limiting aspect of the present disclosure.

FIG. 5 illustrates a partial, top view of a tabless jelly roll 90 in accordance with one non-limiting aspect of the present disclosure. The tabless jelly roll 90 may be configured for use within the battery cell 14 described above, and as described below in more detail, may be particularly beneficial in maximizing volumetric occupation of polygonally shaped battery cases, such as the polygonally shaped battery case 18 described above. The tabless configuration may be characterized by the tabless jelly roll 90 omitting current collector tabs, electrodes, or other included items for assisting in providing electrical connections with the endcaps 34, 36 or other interfaces of the battery cell 14. FIG. 6 illustrates a cross-sectional view of the unwound tabless jelly roll 90 in accordance with one non-limiting aspect of the present disclosure. The tabless jelly roll 90 is shown to be similarly configured to the jelly roll 40 described above with respect to including a plurality of layers 94, 96, 98, 100, i.e., a first separator layer 94, a cathode layer 96, a second separator layer 98, and an anode layer 100. FIG. 7 illustrates a cross-sectional view of the battery cell 14 including the tabless wound jelly roll 90 in accordance with one non-limiting aspect of the present disclosure.

The tabless jelly roll 90 may include the first separator, second separator, and cathode layers 94, 96, 98, with a uniform thickness and the anode layer 100 with a non-uniform, variable thickness. The non-uniform, variable thickness of the anode layer 100 may correspond with a plurality of first anode sections 102 being interspersed between a plurality of second anode sections 104, with the first anode sections 102 having a first thickness and the second anode sections 104 having a second thickness greater than the first thickness. As shown in FIG. 7, when the tabless jelly roll 90 is wound and disposed within the battery case 18, the second anode sections 102 may each be individually aligned with a corresponding one of the radii 74, 76, 78, 80, 82, 84. The second anode sections 102 may be arranged in this manner so that the second anode sections 102 align with the radii 74, 76, 78, 80, 82, 84 and vertices 44, 46, 48, 50, 52, 54 at the time of battery case insertion and/or the tabless jelly roll 90 may be wound, compressed, or otherwise configured to expand once inserted within the battery case 18 such that the second anode sections thereafter align with the radii 74, 76, 78, 80, 82, 84 and vertices 44, 46, 48, 50, 52, 54. The tabless jelly roll 90 may utilize the second or expanded anode sections 104 in this manner to minimize unused space between an outer perimeter of the jelly roll 40 in an inner perimeter of the battery case 18. Alternatively and/or additionally, the cathode layer 96 may similarly include interspersed first and second cathode sections (not shown) similarly having differing first and second thicknesses for purposes of aligning the second or expanded cathode sections with the vertices 44, 46, 48, 50, 52, 54 in a like manner. At least in comparison to a circularly shaped jelly roll (not shown), the tabless jelly roll 90 may project farther into the vertices 44, 46, 48, 50, 52, 54 so as to minimize unused space and maximize volumetric occupation.

Figure 10:
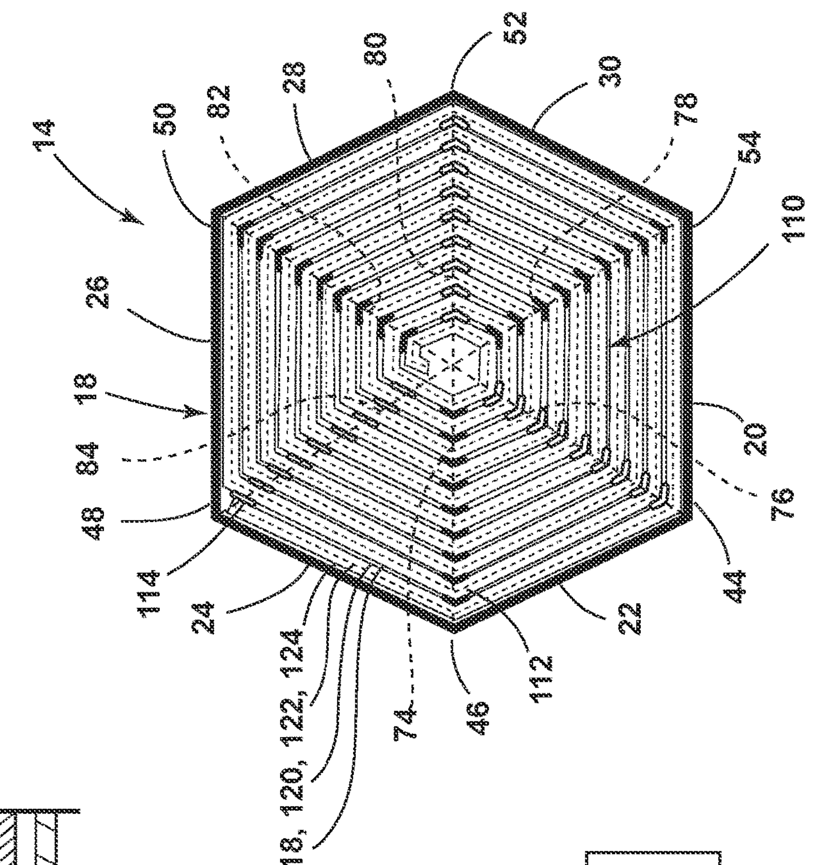
FIG. 10 illustrates a cross-sectional view of the battery cell including the tabbed jelly roll in accordance with one non-limiting aspect of the present disclosure.
Figure 8:
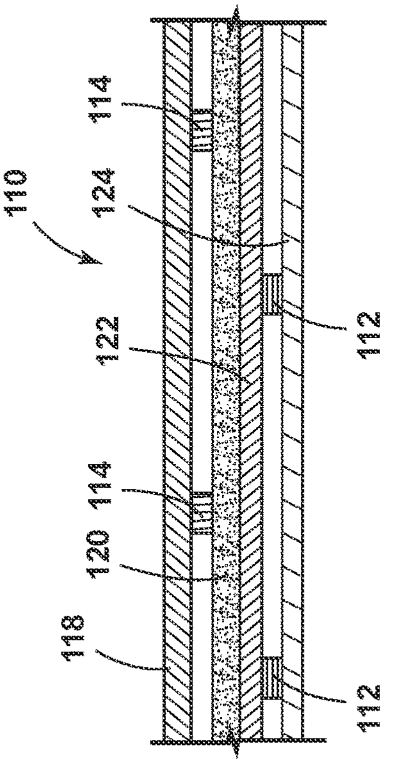
FIG. 8 illustrates a partial, top view of a tabbed jelly roll in accordance with one non-limiting aspect of the present disclosure.
Figure 9:
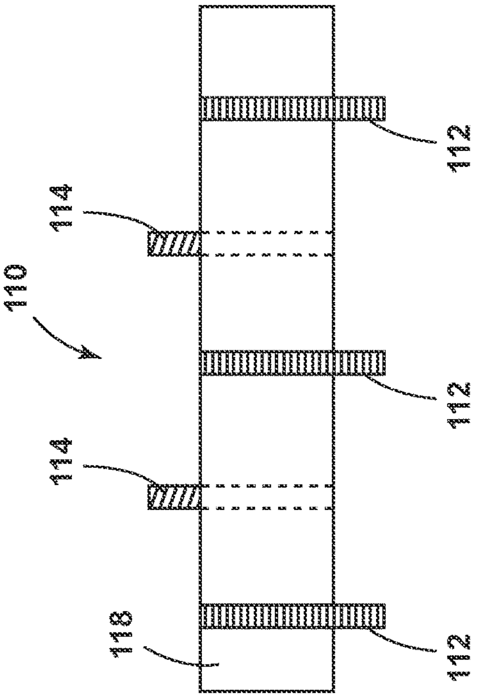
FIG. 9 illustrates a cross-sectional view of the tabbed jelly roll in accordance with one non-limiting aspect of the present disclosure.

FIG. 8 illustrates a partial, top view of a tabbed jelly roll 110 in accordance with one non-limiting aspect of the present disclosure. The tabbed jelly roll 110 may be configured for use within the battery cell 14 described above, and as described below in more detail, may be particularly beneficial in maximizing volumetric occupation of polygonally shaped battery cases, such as the polygonally battery case 18 described above. The tabbed configuration may be characterized by the tabbed jelly roll 110 including current collector tabs, electrodes, or other included items 112, 114 for assisting electrical connections with the endcaps 34, 36 or other interfaces of the battery cell 14. FIG. 9 illustrates a cross-sectional view of the tabbed jelly roll 110 in accordance with one non-limiting aspect of the present disclosure. The tabbed jelly roll 110 is shown to be similarly configured to the jelly roll 40 and the tabless jelly roll 90 described above with respect to including a plurality of layers 118, 120, 122, 124, i.e., a first separator layer 118, a cathode layer 120, a second separator layer 122, and an anode layer 124. FIG. 10 illustrates a cross-sectional view of the battery cell 14 including the tabbed jelly roll 110 in accordance with one non-limiting aspect of the present disclosure.

The tabbed jelly roll 110 may include cathode current collector tabs 114 attached to and spaced apart along a length of the cathode layer 120 and anode current collector tabs 112 attached to and spaced apart along a length of the anode layer 124. As shown in FIG. 10, when the tabbed jelly roll 110 is wound and disposed within the battery case 18, the cathode and anode current collector tabs 112, 114 may each be individually aligned with a corresponding one of the radii 74, 76, 78, 80, 82, 84 and vertices 44, 46, 48, 50, 52, 54 of battery case 18. The cathode and anode current collector tabs 112, 114 may be arranged in this manner so that the cathode and anode current collector tabs 112, 114 align with the radii 74, 76, 78, 80, 82, 84 and vertices 44, 46, 48, 50, 52, 54 at the time insertion and/or the tabbed jelly roll 110 may be wound, compressed, or otherwise configured to expand once inserted within the battery case 18 such that the cathode and anode current collector tabs 112, 114 thereafter align with the radii 74, 76, 78, 80, 82, 84 and vertices 44, 46, 48, 50, 52, 54. The tabbed jelly roll 110 may utilize the cathode and anode current collector tabs 112, 114 in this manner to minimize unused space between an outer perimeter of the tabbed jelly roll 110 and an inner perimeter of the battery case 18. At least in comparison to a circularly shaped jelly roll (not shown), the tabbed jelly roll 110 may project farther into the vertices 44, 46, 48, 50, 52, 54 so as to minimize unused space and maximize volumetric occupation.

As supported above, the present disclosure contemplates replacing use of cylindrical battery cells and form factors in battery packs with the polygonal battery cell described herein due to maximizing volumetric efficiency and improving cell density of the polygonal battery cell being more advantageous. The hexagonal cells, for example, may be used to minimize the cell-to-cell gap and the unutilized space between the cells and RESS boundaries to thus improve the battery pack volumetric efficiency. The hexagonal cells may include a circular or hexagonal wound jelly roll. The hexagonal wound jelly roll may be produced during the jelly roll winding process or formed by pressing a round jelly roll. The battery cell contemplated herein may include a form factor of a hexagonal hard case, optionally with small rounded or blended corners within the vertices.

The terms “comprising”, “including”, and “having” are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term “or” includes any one and all combinations of the associated listed items. The term “any of” is understood to include any possible combination of referenced items, including “any one of” the referenced items. “A”, “an”, “the”, “at least one”, and “one or more” are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term “about” whether or not “about” actually appears before the value. A component that is “configured to” perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A battery cell, comprising:

a jelly roll having a separator layer sandwiched between a cathode active material layer and an anode active material layer, with the separator, cathode, and anode layers wound together relative to a central axis; and a hexagonally shaped case surrounding a perimeter of the jelly roll, the hexagonally shaped case including six sides and six vertices, with each vertex occurring at adjacent pairs of the sides;

wherein:

the cathode active material layer has a non-uniform, variable thickness, with a plurality of first cathode sections having a first thickness interspersed equally between a plurality of second cathode sections having a second thickness, the second thickness being greater than the first thickness.

2. The battery cell according to claim 1, wherein:

the second cathode sections are spaced apart from each other along a length of the cathode active material layer such that each second cathode section aligns when wound with one of a plurality of a radii extending from the central axis to each one of the vertices.

3. The battery cell according to claim 1, wherein:

the anode active material layer has a non-uniform, variable thickness, with a plurality of first anode sections having a first thickness interspersed between a plurality of second anode sections having a second thickness, the second thickness being greater than the first thickness.

4. The battery cell according to claim 3, wherein:

the second anode sections are spaced apart from each other along a length of the anode active material layer such that each second anode section aligns when wound with one of a plurality of a radii extending from the central axis to each one of the vertices.

5. The battery cell according to claim 1, further comprising:

a plurality of cathode current collector tabs spaced apart from each other along a length of the cathode active material layer such that each cathode current collector tab aligns when wound with one of a plurality of a radii extending from the central axis to each one of the vertices.

6. The battery cell according to claim 1, further comprising:

a plurality of anode current collector tabs spaced apart from each other along a length of the anode active material layer such that each anode current collector tab aligns when wound with one of a plurality of a radii extending from the central axis to each one of the vertices.

7. The battery cell according to claim 1, wherein:

the separator layer has a uniform, continuous thickness.

8. The battery cell according to claim 1, wherein:

the hexagonally shaped case has a regular hexagon configuration, with the sides having equal lengths and the vertices have equal angles.

9. The battery cell according to claim 1, wherein:

the hexagonally shaped case has an irregular hexagon configuration, with at least one of:

one or more of the sides having unequal lengths; and one or more of the vertices have unequal angles.

10. The battery cell according to claim 1, wherein:

the jelly roll is circularly shaped; and the central axis is circularly shaped.

11. The battery cell according to claim 1, wherein:

the jelly roll is hexagonally shaped; and the central axis is hexagonally shaped.

12. A battery cell, comprising:

a jelly roll having a separator layer sandwiched between a cathode active material layer and an anode active material layer, with the separator, cathode active material, and anode active material layers wound together relative to a central axis; and a polygonally shaped case surrounding a perimeter of the jelly roll, the polygonally shaped case including a plurality of straight case sides and a plurality of case vertices, with each case vertex occurring at adjacent pairs of the straight case sides;

wherein:

the cathode active material layer includes a plurality of first cathode sections having a first thickness interspersed between a plurality of second cathode sections having a second thickness greater than the first thickness, with the second cathode sections spaced apart from each other along a length of the cathode active material layer such that each second cathode section aligns when wound with one of a plurality of a radii extending from the central axis to each one of the vertices; or the anode active material layer includes a plurality of first anode sections having a first thickness interspersed equally between a plurality of second anode sections having a second thickness greater than the first thickness, with the second anode sections spaced apart from each other along a length of the anode active material layer such that each second anode section aligns when wound with one of the radii.

13. The battery cell according to claim 12, further comprising:

a plurality of cathode current collector tabs spaced apart from each other along a length of the cathode active material layer such that each cathode current collector tab aligns when wound with one of the radii extending from the central axis to each one of the vertices; or a plurality of anode current collector tabs spaced apart from each other along a length of the anode active material layer such that each anode current collector tab aligns when wound with one of the radii.

14. The battery cell according to claim 12, wherein:

the polygonally shaped case has a regular polygon configuration, with the straight case sides having equal lengths and the case vertices have equal angles.

15. The battery cell according to claim 12, wherein:

the polygonally shaped case has an irregular polygon configuration, with at least one of:

one or more of the straight case sides having unequal lengths; and one or more of the case vertices have unequal angles.

16. The battery cell according to claim 12, wherein:

the jelly roll includes a plurality of straight roll sides and a plurality of roll vertices concentrically arranged with a corresponding one of the case sides and case vertices.

17. The battery cell according to claim 16, wherein:

the straight roll sides and the roll vertices abut the corresponding one of the case sides and case vertices.

18. A battery cell system, comprising:

a plurality of battery cells, each battery cell including:

a polygonally shaped case including a plurality of straight case sides and a plurality of case vertices, with one of a plurality of a radii extending from a central axis to each one of the vertices; and a polygonally shaped jelly roll having a separator layer sandwiched between a cathode active material layer and an anode active material layer, with the separator, cathode, and anode active material layers wound together relative to the central axis, the polygonally shaped jelly roll including a plurality of straight roll sides and a plurality of roll vertices concentrically arranged relative to a matching one of the case sides and case vertices;

wherein:

the cathode active material layer includes a plurality of first cathode sections having a first thickness interspersed equally between a plurality of second cathode sections having a second thickness greater than the first thickness, with the second cathode sections spaced apart from each other along a length of the cathode active material layer such that each second cathode section aligns when wound with one of a plurality of a radii extending from the central axis to each one of the vertices; or the anode active material layer includes a plurality of first anode sections having a first thickness interspersed between a plurality of second anode sections having a second thickness greater than the first thickness, with the second anode sections spaced apart from each other along a length of the anode active material layer such that each second anode section aligns when wound with one of the radii; and a pack housing containing the battery cells in a side-by-side manner such that one of the straight case sides of each battery cell abuts no more than one of the straight case sides of each adjacent one of the battery cells.

* * * * *